US010921241B2

(12) United States Patent
Cho et al.

(10) Patent No.: US 10,921,241 B2
(45) Date of Patent: Feb. 16, 2021

(54) OBLIQUE INCIDENCE, PRISM-INCIDENT, SILICON-BASED, IMMERSION MICROCHANNEL-BASED MEASUREMENT DEVICE AND MEASUREMENT METHOD

(71) Applicant: KOREA RESEARCH INSTITUTE OF STANDARDS AND SCIENCE, Daejeon (KR)

(72) Inventors: Hyun Mo Cho, Daejeon (KR); Won Chegal, Daejeon (KR); Yong Jai Cho, Daejeon (KR)

(73) Assignee: KOREA RESEARCH INSTITUTE OF STANDARDS AND SCIENCE, Daejeon (KP)

( * ) Notice: Subject to any disclaimer, the term of this patent is extended or adjusted under 35 U.S.C. 154(b) by 158 days.

(21) Appl. No.: 15/532,896

(22) PCT Filed: Apr. 27, 2016

(86) PCT No.: PCT/KR2016/004386
§ 371 (c)(1),
(2) Date: Jun. 2, 2017

(87) PCT Pub. No.: WO2017/003079
PCT Pub. Date: Jan. 5, 2017

(65) Prior Publication Data
US 2018/0100795 A1    Apr. 12, 2018

(30) Foreign Application Priority Data
Jun. 30, 2015  (KR) ........................ 10-2015-0093229

(51) Int. Cl.
*G01N 21/21* (2006.01)
*G01B 11/06* (2006.01)
(Continued)

(52) U.S. Cl.
CPC ...... *G01N 21/211* (2013.01); *B01L 3/502715* (2013.01); *G01B 11/06* (2013.01);
(Continued)

(58) Field of Classification Search
CPC .. G01N 21/211; G01N 21/21; G01N 21/4133; G01N 2021/213; G01N 21/41;
(Continued)

(56) References Cited

U.S. PATENT DOCUMENTS 6,611,634 B2 *  8/2003  Herron ............... G01N 21/0303
356/317
7,373,255 B2 *  5/2008  Karlsson ............. G01N 33/53
702/19
(Continued)

FOREIGN PATENT DOCUMENTS

JP       S5855758      4/1983
JP       2002171999    6/2002
(Continued)

*Primary Examiner* — Benjamin R Whatley
*Assistant Examiner* — Quocan B Vo
(74) *Attorney, Agent, or Firm* — Allen, Dyer, Coppelt + Gilchrist, P.A.

(57) ABSTRACT

An oblique incidence, prism-incident, silicon-based, immersion microchannel-based measurement device may include: a microchannel structure which has a support, a substrate which is formed on the support and made of a semiconductor or dielectric material, a cover part which has a prism structure and is installed on the support, and a microchannel which is formed in any one of an upper portion of the support and a lower end of the cover part; a sample injection part which forms an adsorption layer for a sample on a substrate by injecting a buffer solution containing the sample made of a biomaterial into the microchannel; a polarized light generation part which emits polarized incident light through an incident surface of the prism to the adsorption
(Continued)

layer at an incident angle that satisfies a p-wave antireflection condition; and a polarized light detection part.

12 Claims, 11 Drawing Sheets

(51) Int. Cl.
*B01L 3/00* (2006.01)
*G01N 21/41* (2006.01)

(52) U.S. Cl.
CPC ......... *G01N 21/21* (2013.01); *G01N 21/4133* (2013.01); *B01L 2300/0654* (2013.01); *B01L 2300/08* (2013.01); *B01L 2300/0816* (2013.01); *B01L 2300/168* (2013.01); *G01N 2021/213* (2013.01)

(58) Field of Classification Search
CPC ............... G01N 11/06; B01L 3/502715; B01L 2300/168; B01L 2300/0816; B01L 2300/08; B01L 2300/0654; G01B 11/06
See application file for complete search history.

(56) References Cited

U.S. PATENT DOCUMENTS

| | | | | |
|---|---|---|---|---|
| 8,502,982 | B2* | 8/2013 | Mace | G01N 21/0303 356/246 |
| 8,940,538 | B2 | 1/2015 | Cho | |
| 9,167,684 | B2* | 10/2015 | Allen | H01L 23/52 |
| 2004/0084402 | A1* | 5/2004 | Ashmead | B01L 3/502707 216/27 |
| 2005/0282221 | A1* | 12/2005 | Barlocchi | B01L 3/502707 435/6.11 |
| 2007/0076214 | A1* | 4/2007 | Rothberg | C40B 60/12 356/491 |
| 2008/0204713 | A1* | 8/2008 | Indermuehle | B01L 3/5085 356/72 |
| 2009/0275016 | A1* | 11/2009 | Miller | G01N 21/05 435/5 |
| 2010/0158756 | A1* | 6/2010 | Taylor | B01L 3/5027 422/69 |
| 2010/0196207 | A1* | 8/2010 | Steinmiller | B01L 3/502707 422/82.09 |
| 2012/0161256 | A1* | 6/2012 | Grudin | G01F 1/6842 257/415 |
| 2012/0295357 | A1* | 11/2012 | Cho | G01N 21/211 436/34 |
| 2013/0171628 | A1* | 7/2013 | Di Carlo | G01N 21/211 436/34 |
| 2015/0253243 | A1* | 9/2015 | Cho | G01N 21/05 356/366 |
| 2016/0084750 | A1* | 3/2016 | Wang | G02B 21/0004 435/30 |

FOREIGN PATENT DOCUMENTS

| | | | | |
|---|---|---|---|---|
| JP | 2005030905 | | 2/2005 | |
| JP | 2010019594 | | 1/2010 | |
| WO | 2011062377 | | 5/2011 | |
| WO | WO2014061924 | * | 4/2014 | ............ G01N 21/21 |

* cited by examiner

OBLIQUE INCIDENCE, PRISM-INCIDENT, SILICON-BASED, IMMERSION MICROCHANNEL-BASED MEASUREMENT DEVICE AND MEASUREMENT METHOD

TECHNICAL FIELD

The present disclosure relates to an oblique incident structure for a method of measuring binding properties of a molecule such as a biomaterial and a refractive index of a buffer solution by using reflectometry and ellipsometry under an immersion microchannel environment. More particularly, the present disclosure relates to a measurement device in which a substrate, which is attached to a bottom surface of a prism and a trapezoidal microchannel, is inclined, thereby enabling high sensitive measurement by effectively removing light reflected by a boundary surface between the prism and a medium and minimizing scattering at the boundary surface of the microchannel, and a measurement method using the same.

BACKGROUND ART

Reflectometry and ellipsometry are optical analysis technologies that obtain thicknesses or optical physical properties of a sample by measuring a change in reflectivity or a polarized state of reflective light reflected by a surface of the sample and analyzing the measured value.

As measurement instruments using the reflectometry and ellipsometry, there are a reflectometer and an ellipsometer. The reflectometer and the ellipsometer are utilized to evaluate thicknesses and physical properties of various nano-level thin films in a process of manufacturing nano-thin films in semiconductor industries. In addition, there have been continued efforts to apply the reflectometer and the ellipsometer to analysis of an interface of a biomaterial such as protein, DNA, virus, or a new medicine material by widening a utilization range of the reflectometer and the ellipsometer to the biotech industry.

A reflectometer in the related art is sufficient to evaluate a thickness and physical properties of a nano-thin film having a size of several nanometers (nm) or more, but there is a problem in that reliability of the reflectometer deteriorates because of low measurement sensitivity when analyzing a low molecular biomaterial that requires sensitivity in a range of about 1 to 0.001 nanometer. In comparison with the reflectometer, the ellipsometer has measurement sensitivity of 0.01 nm or lower, and particularly has high measurement sensitivity in a condition in which comparison of refractive indexes is large such as measurement of a thickness of an oxide film that has a relatively lower refractive index than a semiconductor on a semiconductor substrate having a high refractive index.

However, the ellipsometer requires a measurement method with improved sensitivity in order to analyze a low molecular biomaterial.

As a technology in the related art for improving measurement sensitivity when analyzing a biomaterial, there is a surface plasmon resonance (SPR) sensor (hereinafter, referred to as an 'SPR sensor') in the form of a combination of the reflectometry and a surface plasmon resonance (SPR) technology.

The surface plasmon resonance (SPR) phenomenon refers to a phenomenon in which electrons existing on a metal surface are excited by light waves and collectively vibrate in a normal direction to the surface, and thus light energy is absorbed. It has been known that the SPR sensor may use the surface plasmon resonance sensitive to polarization properties of light in order to not only measure changes in thickness and refractive index of the nano-thin film abutting the metal surface, but also to measure a change in adsorption concentration of the biomaterial in real time by means of a non-labeling method that does not use a fluorescent material.

The SPR sensor uses a principle in which a resonant angle is changed by coating a material such as glass with a metal thin film of several tens of nanometers, making a sensor onto which a biological material may be bound, and binding a sample, in which a buffer solution is melted, to the sensor, and the resonant angle is made by measuring reflectivity. When light enters the SPR sensor, the glass material becomes an incident medium, and light passes through a thin film layer onto which the biological material is bound, such that the buffer solution finally becomes a substrate.

In this structure, similar to a change in biological thin film layer caused by binding of a sample to be measured, a refractive index of a buffer solution, which is a substrate material, directly affects a movement of the resonant angle. Therefore, it is necessary to independently measure and correct a refractive index of the buffer solution in order to purely measure only binding dynamic characteristics.

In order to correct a change in refractive index of the buffer solution and prevent an error caused by diffusion between the sample and the buffer solution, a method, which corrects the change in refractive index by using a precise valve device, an air injection device, and two or more channels, and using one channel as a reference channel, has been used. However, it is difficult to distinguish between a change in SPR angle caused by a change in refractive index of the buffer solution and a change in SPR angle caused by pure adsorption and dissociation properties, which may always act as a cause of a measurement error. As a result, it is basically difficult for the SPR sensor in the related art to measure adsorption and dissociation properties of a material having a small molecular weight such as a low molecular material due to a limitation of the measurement method.

In addition, the SPR sensor in the related art uses a metal thin film made of precious metal such as gold (Au) and silver (Ag) for the surface plasmon resonance, which incurs a large amount of manufacturing costs for the sensor. Further, in the case of the metal thin film, there are problems in that deviation of a refractive index is great because surface roughness is not uniform due to a manufacturing process, it is difficult to quantitatively measure biomaterials due to unstable optical properties, and there occurs an error due to different sensitivity properties at different positions when relatively comparing the reference channel.

In order to solve a drawback of the SPR sensor, a biological material binding sensor layer is formed on a substrate material such as silicon, and an amplitude and a phase of light, which passes through the buffer solution and is reflected by the substrate material under an immersion microchannel environment, are measured by means of ellipsometry in a p-wave antireflection condition, and as a result, it is possible to obtain a signal in which the measured amplitude is not sensitive to a change in refractive index of the buffer solution but sensitive to binding dynamic characteristics of the biological material. In a case in which the binding properties of the biological material, which is adsorbed to the substrate material, are measured under the immersion microchannel environment, the buffer solution becomes an incident medium in contrast to the SPR measurement, and the light, which passes through a biological material adsorption layer, is reflected by the substrate material.

In this measurement condition, a measured ellipsometric angle is not sensitive to a change in refractive index of the incident medium which is the buffer solution but sensitive only to a change of the biological thin film and the substrate material. In the case of the substrate made of a material such as silicon having a stable refractive index, a measured ellipsometric angle ψ may enable a signal sensitive only to a change of the biological thin film to be obtained, and an ellipsometric angle Δ produces a signal sensitive only to a refractive index of the buffer solution, and as a result, it is possible to simultaneously measure a thickness of the biological thin film and a refractive index of the buffer solution. However, in a case in which a substrate, which is parallel to a flat incident structure such as a prism, is used, it is necessary to remove light reflected by a boundary surface between the prism and the buffer solution and use only light reflected by the substrate. It is necessary to reduce an interval between a prism surface and a substrate material in order to minimize a usage amount of a sample, but in this case, it is difficult to separate reflected two lights because the two lights are positioned at a very small distance, which acts as a measurement error. Therefore, there is a need for a measurement method having a new structure for distinguishing between the light reflected by the boundary surface between the prism and the buffer solution and the light reflected by the substrate material including the sensor in the flat incident structure such as the prism.

FIG. 1 is a configuration diagram of a prior patent in which a sensor layer is formed on a substrate material such as silicon and the ellipsometry is performed under an immersion microchannel environment in order to solve the drawbacks of the SPR sensor. As illustrated in FIG. 1, a biological material binding property sensor according to the prior patent roughly includes a microchannel structure 100, a substrate 120, a cover part 140, a microchannel 150, a sample injection part 200, a polarized light generation part 300, and a polarized light detection part 400. In the biological material binding property sensor according to the prior patent, an adsorption layer 160 is formed on the substrate 120 or a dielectric thin film 130, and an environment of the immersion microchannel 150 is formed. In this case, when a buffer solution 210, in which a sample 1 made of a biomaterial is dissolved, is injected into the microchannel 150, the biomaterial is adsorbed to a ligand material 2 formed on a surface of the adsorption layer 160, such that the adsorption layer having a predetermined thickness is formed.

Further, polarized incident light generated from the polarized light generation part 300 passes through an incident surface 142 and enters a boundary surface between the buffer solution 210 and the substrate 120 at an angle that causes a p-wave antireflection condition. In this case, reflective light reflected by the substrate 120 includes optical data related to refractive indexes of the adsorption layer of the sample 1 and the buffer solution. That is, in a process in which the sample 1 is adsorbed to and dissociated from the ligand 2, molecule adsorption and dissociation dynamic characteristics (binding and dissociation kinetics) such as adsorption concentration, a thickness or a refractive index of the adsorption layer, and a refractive index of the buffer solution are changed, and as a result, the measured ellipsometric angles are changed. Further, the reflective light including the optical data passes through the buffer solution 210 and a reflective surface 144 and is detected by the polarized light detection part 400. In this case, the polarized light detection part 400 measures a change according to polarized light component of the reflective light, that is, measures the ellipsometric angles, thereby recognizing molecule adsorption and dissociation dynamic characteristics of the sample 1 and a refractive index of the buffer solution.

FIG. 2 illustrates an adsorption curve, which indicates a process in which the sample 32 is adsorbed to the metal thin film 20, and a dissociation curve which indicates a process in which the sample 32 is dissociated from the metal thin film 20. The larger the adsorption rate constant (association rate constant) $k_a$, the faster the biomaterial is absorbed, and the smaller the dissociation rate constant $k_a$, the slower the biomaterial is dissociated.

That is, a dissociation constant ($K_D = k_d/k_a$) in an equilibrium state may be obtained by measuring the adsorption rate constant and the dissociation rate constant. For example, properties of a new low molecular medicine candidate material, which may be used as a carcinogenesis inhibitor and adsorbed to or dissociated from protein including a carcinogenesis inducing factor, is measured, and whether the low molecular medicine candidate material may be used as a new medicine may be determined.

Hereinafter, characteristics and limitations of the biomaterial analysis sensor according to the prior patent will be described with reference to FIGS. 3 and 4. In a case in which light enters by using an incident structure of a prism as illustrated in FIG. 3, light enters the boundary surface at an inclination angle $\theta_2$ of about 70.85° ($\theta_2 = 70.85°$), and when the light enters the buffer solution from the prism, a change in angle of about −0.024° is shown by a change (0.0002) in refractive index of the buffer solution. The p-wave antireflection condition is in the vicinity of $\theta_2 = 70.85°$, and the current angle is changed to 70.826° smaller by 0.024° due to a change in refractive index of the buffer solution, and as a result, a graph ψ and Δ is shown as illustrated in FIG. 4, and the p-wave antireflection angle is rarely changed due to a change in refractive index, such that values of ψ and Δ are measured at an angle of 70.826° smaller by 0.24°.

In FIG. 4, in a case in which the buffer solutions 210 have different refractive indexes, a solid line graph indicates that a refractive index of the buffer solution 210 is 1.3330, and a dotted (dash dot) line graph indicates that a refractive index of the buffer solution 210 is 1.3332. According to a measurement result according to the change in incident angle in a case in which the prism structure is used, the change in ψ value acts in a direction in which a small change in a vertical incident structure is further cancelled out as illustrated in FIG. 4, such that the ψ value is rarely changed, but in contrast, the Δ value is greatly changed. That is, the ellipsometric constant Δ related to a phase difference is changed sensitive only to a change in refractive index of the buffer solution and rarely affected by binding properties, and as a result, it is possible to measure only a change in refractive index of the buffer solution with high sensitivity. The ellipsometric constant Δ is very greatly changed as a thin film material has a very small thickness, and in a case in which the measurement method is utilized for an application research for measuring a change in refractive index and analyzing a change in physical properties or binding properties of the material, the measurement method may measure a refractive index with ultrahigh sensitivity in comparison with the existing SPR measurement method.

Pure binding dynamic characteristics and a change in refractive index of the buffer solution may be simultaneously measured when the buffer solution of which the refractive index is changed due to the continuously supplied buffer solution, a solvent used for the sample, and the like is supplied to the sensor through the microchannel.

However, in FIG. 3, in a case in which an interval between a bottom surface of the prism and the substrate material is small, it is difficult to separate the light reflected by the boundary surface between the prism and the buffer solution and the light reflected by the substrate material. Because the measurement is performed in the p-wave antireflection condition, intensity of the light reflected by the substrate material is relatively lower than intensity of the light reflected by the boundary surface between the prism and the buffer solution, and as a result, there may be a problem in that a measurement error occurs.

TECHNICAL PROBLEM

The present disclosure has been made in an effort to solve the aforementioned problems, and to provide a measurement device and a measurement method which separate light reflected by a boundary surface between a prism and a buffer solution and light reflected by a substrate material in a case in which an interval between a bottom surface of the prism and the substrate material is small. In particular, the present disclosure has also been made in an effort to provide a measurement device and a measurement method which solve a problem in that because measurement is performed in a p-wave antireflection condition, intensity of light reflected by a substrate material is relatively lower than intensity of light reflected by a boundary surface between a prism and a buffer solution, and as a result, a measurement error occurs.

Other objects, particular advantages, and novel features of the present disclosure will be more clearly understood from the following detailed description and the exemplary embodiments with reference to the accompanying drawings.

TECHNICAL SOLUTION

To achieve the aforementioned objects, an oblique incidence, prism-incident, silicon-based, immersion microchannel-based measurement device related to an example of the present disclosure may include: a microchannel structure which has a support, a substrate which is formed on the support and made of a semiconductor or dielectric material, a cover part which has a prism structure and is installed on the support, and a microchannel which is formed in any one of an upper portion of the support and a lower end of the cover part; a sample injection part which forms an adsorption layer for a sample on a substrate by injecting a buffer solution containing the sample made of a biomaterial into the microchannel; a polarized light generation part which emits polarized incident light through an incident surface of the prism to the adsorption layer at an incident angle that satisfies a p-wave antireflection condition; and a polarized light detection part which first reflective light reflected by at least one of the adsorption layer and the substrate enters through a reflective surface of the prism and which detects a change in polarization of the first reflective light, in which a surface of the substrate is formed so as to form a predetermined inclination angle with a bottom surface of the prism.

In addition, the first reflective light travels in a direction different from that of light reflected by the bottom surface of the prism.

In addition, the polarized light detection part may separate and detect the first reflective light and the light reflected by the bottom surface of the prism.

In addition, an opened through portion may be formed in an upper surface of the support.

In addition, the through portion may be formed in a trapezoidal shape, and the trapezoidal shape of the through portion may be formed such that an upper side positioned in a direction toward the incident surface has a smaller length than a lower side positioned in a direction toward the reflective surface.

In addition, the incident light may be emitted to the adsorption layer through the opened through portion, and the trapezoidal shape may block a reflection of a part of the incident light.

In addition, the upper side of the trapezoidal shape defines a first inclined portion of which the upper side is inclined, and the lower side of the trapezoidal shape defines a second inclined portion of which the upper side is inclined.

In addition, a width of a cross section of each of the first inclined portion and the second inclined portion is decreased toward a pointed end thereof, and the pointed end of the first inclined portion is positioned lower than the pointed end of the second inclined portion.

In addition, an inflow path through which the buffer solution flows into the microchannel may be formed at an upper side of the upper side of the trapezoidal shape of the through portion, and a discharge path through which the buffer solution flowing into the microchannel is discharged may be formed at a lower side of the lower side of the trapezoidal shape of the through portion.

In addition, the inclination angle is in a range from 0° to 10°.

In addition, the through portion may be formed in a trapezoidal shape, and the trapezoidal shape of the through portion may be formed such that an upper side positioned in a direction toward the incident surface has a larger length than a lower side positioned in a direction toward the reflective surface.

The microchannel structure may further include a dielectric thin film provided between the substrate and the adsorption layer, and the first reflective light may further include light reflected by the dielectric thin film.

To achieve the aforementioned objects, an immersion microchannel measurement device related to another example of the present disclosure may include: a microchannel structure which has a support, a substrate which is formed on the support and made of a semiconductor or dielectric material, a cover part which has a flat plate structure and is installed on the support, and a microchannel which is formed in any one of an upper portion of the support and a lower end of the cover part; a sample injection part which forms an adsorption layer for a sample on a substrate by injecting a buffer solution containing the sample made of a biomaterial into the microchannel; a polarized light generation part which emits polarized incident light through an incident surface of the flat plate to the adsorption layer at an incident angle that satisfies a p-wave antireflection condition; and a polarized light detection part which first reflective light reflected by at least one of the adsorption layer and the substrate enters through a reflective surface of the flat plate and which detects a change in polarization of the first reflective light, in which a surface of the substrate is formed so as to form a predetermined inclination angle with a bottom surface of the flat plate.

To achieve the aforementioned objects, a microchannel structure related to still another example of the present disclosure may include: a support; a substrate which is formed on the support and made of a semiconductor or dielectric material; a cover part which has a prism structure and is installed on the support; and a microchannel which is formed in any one of an upper portion of the support and a lower end of the cover part, in which an adsorption layer for a sample is formed on the substrate by injecting a buffer solution containing the sample made of a biomaterial into the microchannel, polarized incident light is emitted through an incident surface of the prism to the adsorption layer at an incident angle that satisfies a p-wave antireflection condition, first reflective light, which is reflected from at least one of the adsorption layer and the substrate, exits through a reflective surface of the prism, and a surface of the substrate is formed so as to form a predetermined inclination angle with a bottom surface of the prism.

To achieve the aforementioned objects, a microchannel structure related to yet another example of the present disclosure may include: a support; a substrate which is formed on the support and made of a semiconductor or dielectric material; a cover part which has a flat plate structure and is installed on the support; and a microchannel which is formed in any one of an upper portion of the support and a lower end of the cover part, in which an adsorption layer for a sample is formed on the substrate by injecting a buffer solution containing the sample made of a biomaterial into the microchannel, polarized incident light is emitted through an incident surface of the flat plate to the adsorption layer at an incident angle that satisfies a p-wave antireflection condition, first reflective light, which is reflected from at least one of the adsorption layer and the substrate, exits through a reflective surface of the flat plate, and a surface of the substrate is formed so as to form a predetermined inclination angle with a bottom surface of the flat plate.

To achieve the aforementioned objects, an immersion microchannel measurement method related to still yet another example of the present disclosure may include: a first step of injecting, by a sample injection part, a buffer solution containing a sample made of a biomaterial into a microchannel of a microchannel structure; a second step of forming an adsorption layer by adsorbing the sample to a substrate of the microchannel structure; a third step of polarizing, by a polarized light generation part, light and allowing the light to enter the adsorption layer through an incident surface of a prism of the microchannel structure at an incident angle that satisfies a p-wave antireflection condition; a fourth step of allowing first reflective light, which is reflected from at least one of the adsorption layer and the substrate, to enter through a reflective surface of the prism; and a fifth step of detecting, by a polarized light detection part, a change in polarization of the first reflective light, in which a surface of the substrate is formed so as to form a predetermined inclination angle with a bottom surface of the prism.

To achieve the aforementioned objects, an immersion microchannel measurement method related to a further example of the present disclosure may include: a first step of injecting, by a sample injection part, a buffer solution containing a sample made of a biomaterial into a microchannel of a microchannel structure; a second step of forming an adsorption layer by adsorbing the sample to a substrate of the microchannel structure; a third step of polarizing, by a polarized light generation part, light and allowing the light to enter the adsorption layer through an incident surface of a flat plate of the microchannel structure at an incident angle that satisfies a p-wave antireflection condition; a fourth step of allowing first reflective light, which is reflected from at least one of the adsorption layer and the substrate, to enter through a reflective surface of the flat plate; and a fifth step of detecting, by a polarized light detection part, a change in polarization of the first reflective light, in which a surface of the substrate is formed so as to form a predetermined inclination angle with a bottom surface of the flat plate.

In addition, the first reflective light may travel in a direction different from that of light reflected by the bottom surface of the prism, and in the fifth step, the polarized light detection part may separate and detect the first reflective light and the light reflected by the bottom surface of the prism.

In addition, the fifth step may further include: polarizing, by an analyzer, the first reflective light; detecting, by a photodetector, the polarized first reflective light and obtaining predetermined optical data; and obtaining, by an analysis means, a refractive index of the buffer solution by obtaining an ellipsometric constant related to a phase difference of ellipsometry based on the optical data, and deriving measured values including adsorption concentration of the sample and adsorption and dissociation constants by obtaining an ellipsometric constant related to an amplitude ratio.

ADVANTAGEOUS EFFECTS

As described above, according to the oblique incidence, prism-incident, silicon-based, immersion microchannel-based measurement device and the oblique incidence, prism-incident, silicon-based, immersion microchannel-based measurement method according to the present disclosure, the bottom surface of the prism and the substrate attached to the microchannel are inclined, such that only a signal reflected by the substrate material is separated and detected unlike a traveling direction of scattered light reflected in the microchannel structure of the sensor attached to the boundary surface between the prism and the medium, thereby obtaining high measurement sensitivity. The existing measurement method has problems in that a measurement error may occur because the light reflected by the boundary surface between the prism and the measurement medium is higher in energy than the light reflected by the substrate material and it is difficult to separate the light reflected by the boundary surface between the prism and the measurement medium and the light reflected by the substrate material, and a measuring range for the measurement in respect to other angles that vary in accordance with a change in refractive index is restricted in a case in which an aperture for separating the light reflected by the boundary surface between the prism and the measurement medium and the light reflected by the substrate material is used. However, it is possible to sufficiently separate the light reflected by the boundary surface between the prism and the measurement medium and the light reflected by the substrate material by manufacturing the bottom surface of the prism and the substrate attached to the microchannel by inclining the bottom surface of the prism and the substrate attached to the microchannel by about two degrees.

In particular, the trapezoidal microchannel structure is used, light enters the narrow microchannel structure, and the light travels through the wide microchannel structure, such that the narrow microchannel structure serves as a preceding aperture, and as a result, it is possible to minimize double scattering caused by the microchannel structure. Further, multiple microchannels are manufactured, and light having a large area enters by using a cylinder lens or the like, and as a result, it is possible to conveniently measure the multi-channel microchannel with high sensitivity.

In addition, the microchannel structure of the present disclosure provides the trapezoidal microchannel coupled to the prism structure optimized for analysis of a biomaterial, and the microchannel structure is configured by multiple channels or a single channel in which a plurality of self-assembled monolayers is formed. Therefore, it is possible to provide various types of experimental conditions such as a condition in which a sample is injected into the microchannels of the multiple channels while changing concentration of the sample or a condition in which adsorption degrees of the self-assembled monolayers vary, and as a result, it is possible to improve efficiency of the experiment on the analysis of the biomaterial.

Furthermore, the present disclosure may measure the biomaterial with high sensitivity by a non-labeling method under an immersion microchannel environment, and as a result, the present disclosure may be widely utilized in various industries such as biological, medical, food, and environmental industries.

While the present disclosure has been described with reference to the aforementioned exemplary embodiments, those skilled in the art can easily recognize that various other modifications and alterations may be made without departing from the subject matter and the scope of the present disclosure, and it is apparent that all of these modifications and alterations fall within the appended claims.

DESCRIPTION OF DRAWINGS

The following drawings attached to the present specification illustrate exemplary embodiments of the present disclosure and serve to further understand the technical spirit of the present disclosure together with the detailed description of the present disclosure, and the present disclosure should not be interpreted as being limited to the items illustrated in the drawings.

DESCRIPTION OF MAIN REFERENCE NUMERALS OF DRAWINGS

Figure 1:
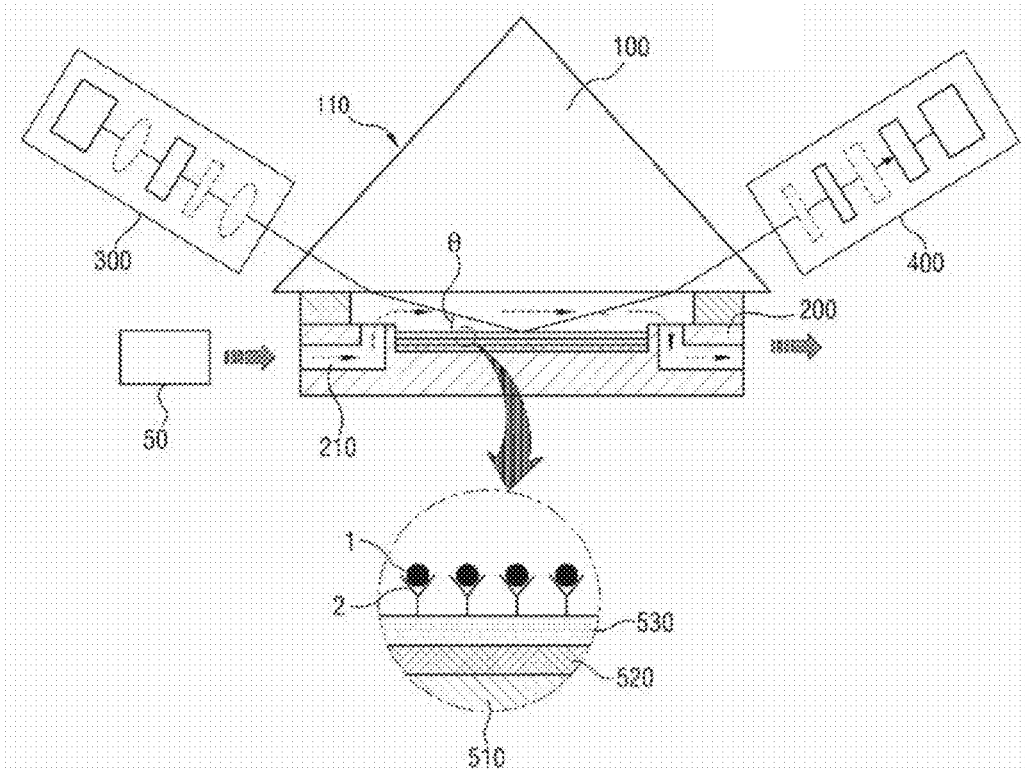
FIG. 1 is a cross-sectional view illustrating a biological material binding property measuring sensor according to a prior patent.
Figure 2:
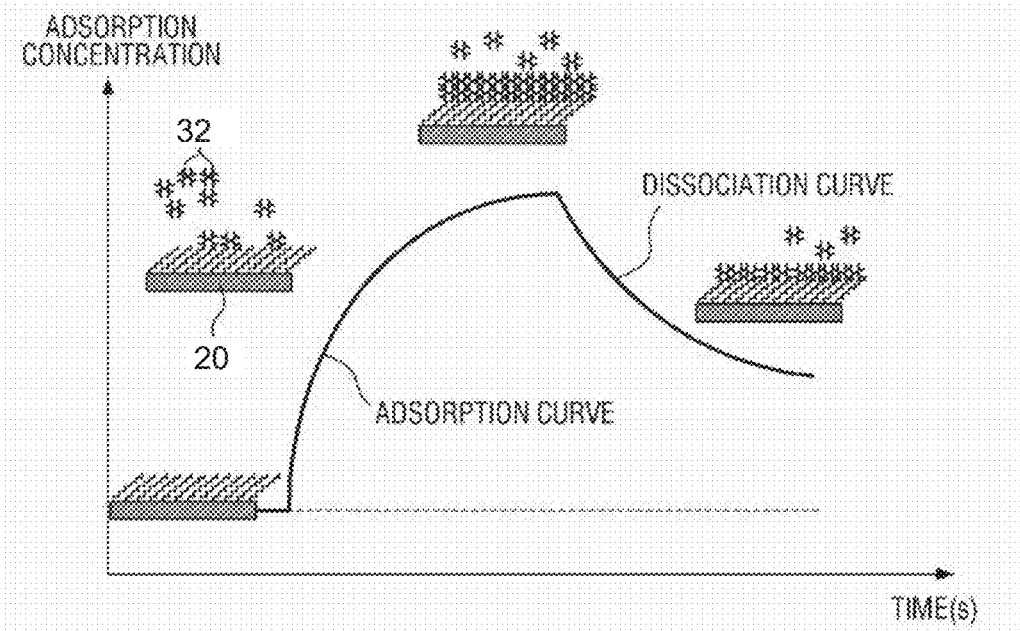
FIG. 2 is a schematic view illustrating a change in adsorption concentration in a process in which a sample is adsorbed to or dissociated from a metal thin film.
Figure 3:
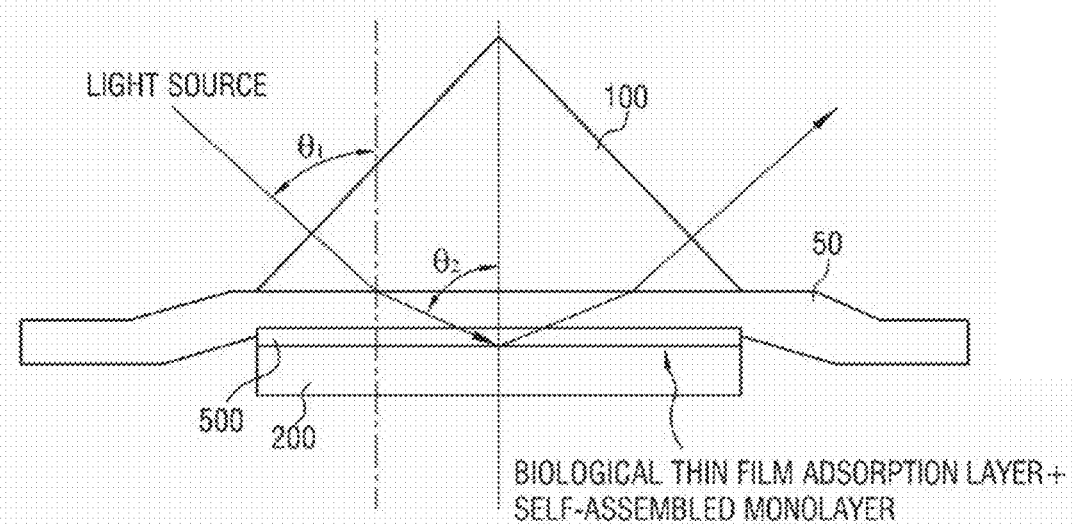
FIG. 3 is a schematic view for explaining a problem in the related art in which a change in inherent adsorption and dissociation dynamic characteristics of a sample, which are shown by adsorption and dissociation processes of the sample, and a change in refractive index of a buffer solution are mixed.
Figure 4:
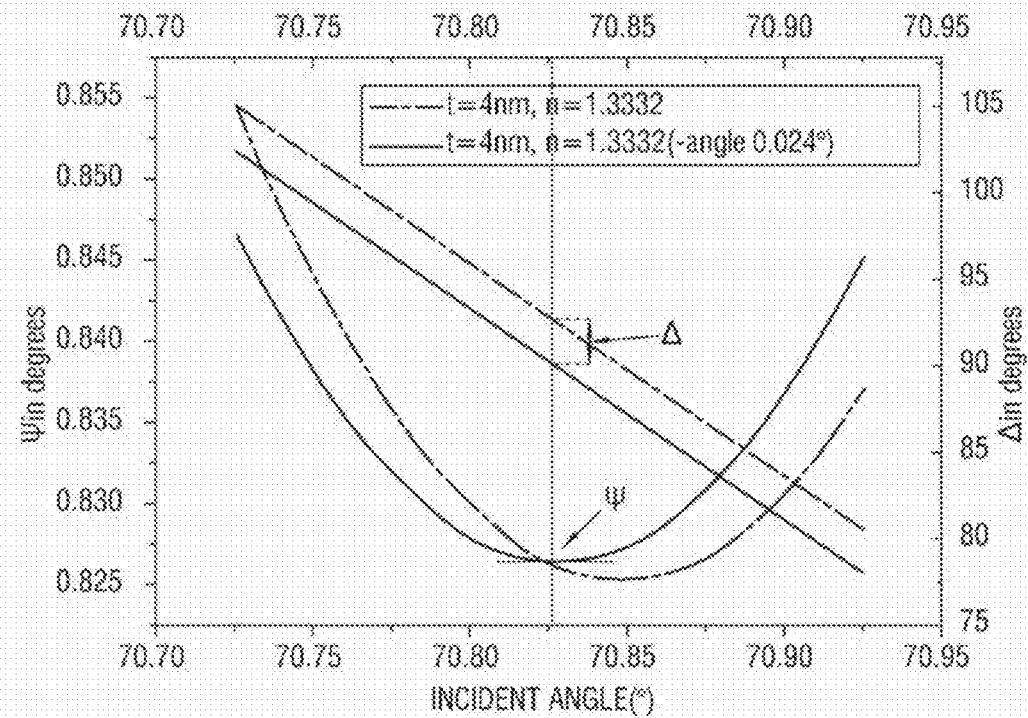
FIG. 4 is a graph illustrating measurements of ellipsometric constants ψ and Δ according to adsorption of a biological material and a change in refractive index of the buffer solution by using the biological material binding property measuring sensor of the prior patent.

100: Microchannel structure
110: Support
112: Groove portion
114: First inclined portion
115: Second inclined portion
116: Through portion
120: Substrate
130: Dielectric thin film
132: Self-assembled monolayer
140: Cover part
142: Prism
143: Incident surface
144: Reflective surface
146: Partition wall
150: Microchannel
152: Inflow path
154: Discharge path
160: Adsorption layer
200: Sample injection part
210: Buffer solution
300: Polarized light generation part
310: Light source
320: Polarizer
330: Collimating lens
340: Focusing lens
350: First compensator
400: Polarized light detection part
410: Analyzer
420: Photodetector
430: Arithmetic processor
440: Second compensator
450: Spectrometer

BEST MODE

First, a configuration of an oblique incidence, prism-incident, silicon-based, immersion microchannel-based measurement device according to an exemplary embodiment of the present disclosure will be described with reference to the accompanying drawings.

Figure 5:
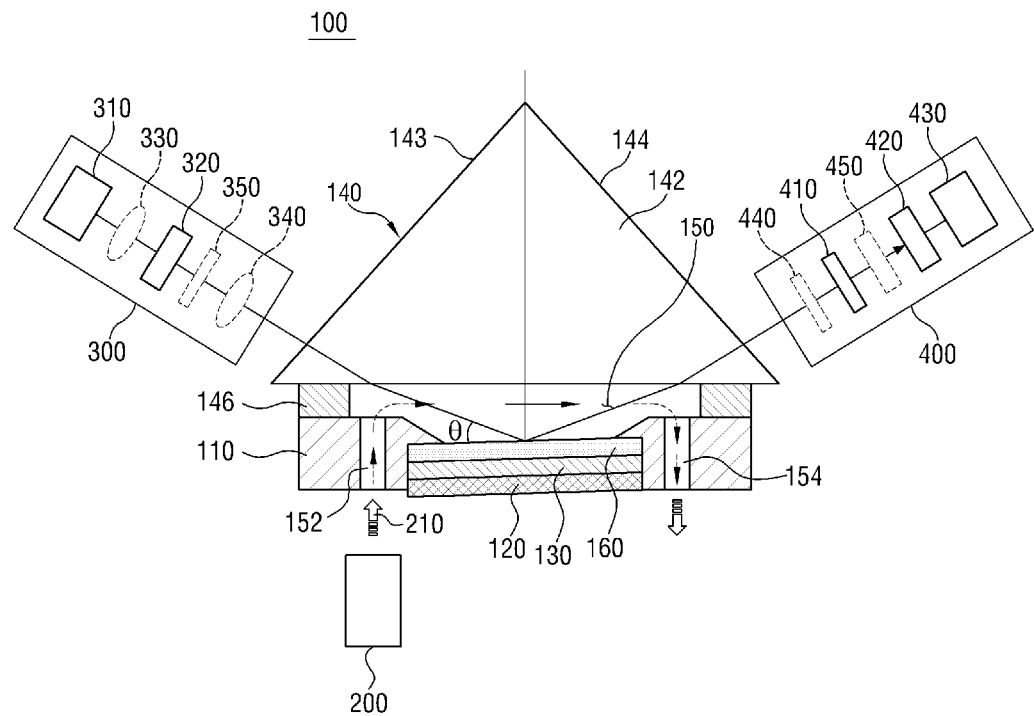
FIG. 5 is a cross-sectional view illustrating a configuration of an oblique incidence, prism-incident, silicon-based, immersion microchannel-based measurement device according to an exemplary embodiment of the present disclosure.

FIG. 5 is a schematic view illustrating a configuration of the oblique incidence, prism-incident, silicon-based, immersion microchannel-based measurement device according to the exemplary embodiment of the present disclosure. As illustrated in FIG. 5, a device for simultaneously measuring molecular binding properties and a refractive index of a buffer solution according to the exemplary embodiment of the present disclosure is configured as an optical system that broadly includes a microchannel structure 100 which provides an immersion microchannel environment, a sample injection part 200, a polarized light generation part 300 which provides incident light, and a polarized light detection part 400 which detects a change in polarization of reflective light.

The present disclosure serves to measure adsorption and dissociation dynamic characteristics of a biomaterial such as a low molecular material by using ellipsometry, and has a structure in which a buffer solution 210 containing a sample (not illustrated) made of the biomaterial is injected into the microchannel structure 100 by the sample injection part 200. In this case, as described below, a microchannel 150 of the microchannel structure 100 includes multiple channels or a single channel.

Figure 6A:
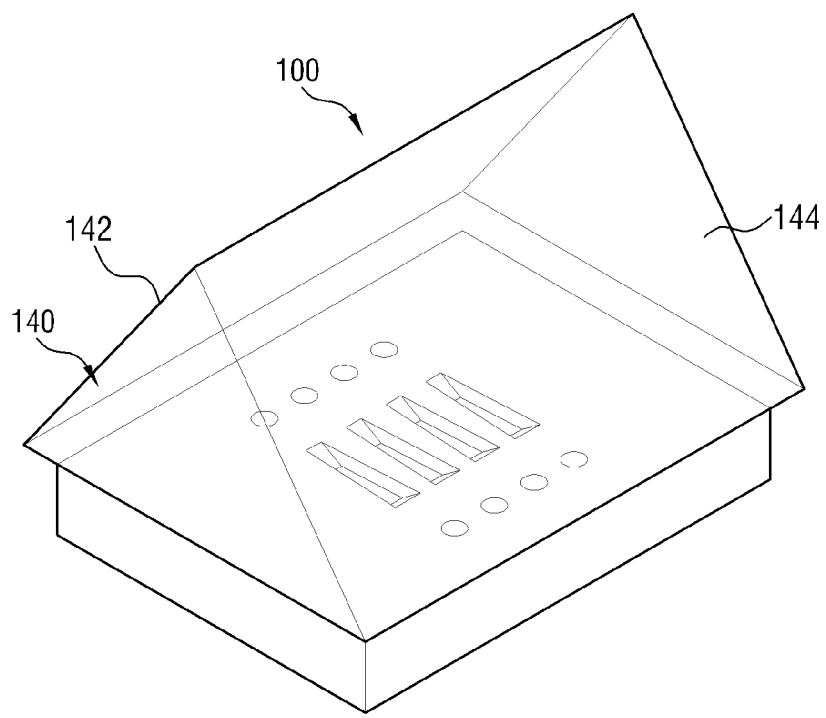
FIG. 6A is a perspective view of a multi-channel microchannel structure according to the exemplary embodiment of the present disclosure.
Figure 6B:
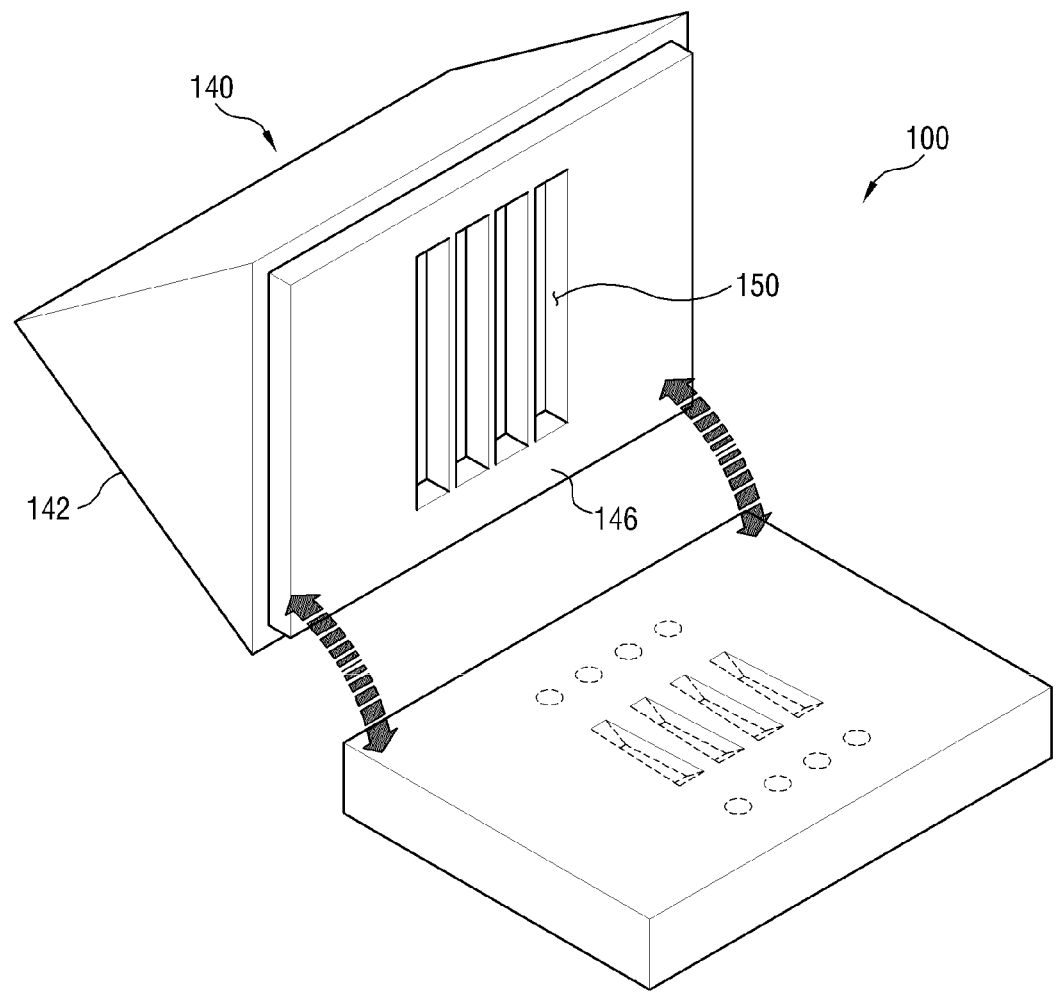
FIG. 6B is a exploded perspective view of the multi-channel microchannel structure according to the exemplary embodiment of the present disclosure.

FIG. 6A is a perspective view illustrating an example of a multi-channel microchannel structure according to the present disclosure, and FIG. 6B is an exploded perspective view of the multi-channel microchannel structure. As illustrated in FIGS. 6A and 6B, the microchannel structure 100 includes a support 110, a substrate 120, an adsorption layer 160, and a cover part 140, and has a multi-channel structure in which the plurality of microchannels 150 is formed.

As illustrated in FIG. 6B, the support 110 has a quadrangular plate shape, and has a groove portion 112 in which the substrate 120 and the adsorption layer 160 are formed. Further, inflow paths 152 and discharge paths 154 of the microchannels 150 are formed at one side and the other side based on the groove portion 112. In this case, the groove portion 112, the inflow paths 152, and the discharge paths 154 are formed by using a semiconductor etching technology or an exposure technology.

The substrate 120 has a quadrangular plate shape, and is formed in the groove portion 112 of the support 110. According to the exemplary embodiment of the present disclosure, the substrate 120 has a complex refractive index of about $3.8391+i\,0.018186$ at 655 nm, and the substrate 120 is made of silicon Si which is inexpensive and provides constant and stable physical properties. However, a semiconductor or dielectric material may be used as a material of the substrate 120 instead of silicon.

A sample (not illustrated) made of a low molecular biomaterial is adsorbed to and dissociated from the adsorption layer 160, and the adsorption layer 160 serves to reflect the incident light. As illustrated in FIGS. 5 and 6B, the surface joint portion 160 is formed at an upper side of the substrate 120.

The adsorption layer 160 according to the exemplary embodiment of the present disclosure may be configured by at least one of a self-assembled thin film and a biological thin film. In addition, the exemplary embodiment of the present disclosure may further include a dielectric thin film layer 130 between the silicon substrate 120 and the adsorption layer 160.

The dielectric thin film 130 is made of a transparent thin film material including a semiconductor oxide film or a glass film. Further, a thickness of the dielectric thin film may be 0 to 1000 nm. Meanwhile, an example of the dielectric thin film 130, which may be most easily obtained, includes a silicon oxide film ($SiO_2$) made by naturally oxidizing silicon, and growing the silicon to a thickness of several nanometers. A refractive index of the silicon oxide film is about 1.456 at 655 nm, and is greatly different in refractive index from the substrate 120 made of silicon, and thus the silicon oxide film contributes to an increase in measurement sensitivity of the present disclosure.

In addition, a glass film made of optical glass may be used as the dielectric thin film 130. In comparison with a metal thin film made of gold or silver, the dielectric thin film 130 made of silicon, a silicon oxide film, or a glass film may be manufactured to have a constant refractive index, and there is an advantage in that it is possible to provide stable optical properties and reduce manufacturing costs.

As illustrated in FIGS. 5 to 6B, the cover part 140 is installed on the support 110, and may include a prism 142 and partition walls 146. The light, which enters an incident surface 143 of the prism 142, is refracted to a microchannel medium in the microchannel structure coupled to the prism 142, and the refracted light enters the substrate material at an angle that satisfies a p-wave antireflection condition.

Further, as illustrated in FIG. 6B, the cover part 140 has the plurality of partition walls 146 on a lower surface of the prism 142 in order to form a micro-scaled microchannels 150. The prism 142 and the microchannel structure may be made of a permeable material such as glass or transparent synthetic resin, but the entire configuration including the microchannel partition wall 146 may be integrally formed by using a molding method or the like so as to be easily manufactured.

Meanwhile, acrylic resin such as polymethyl methacrylate (PMMA) may be used as an example of synthetic resin. Further, a silicon-based material such as polydimethylsiloxane (PDMS) may also be used.

The plurality of microchannels 150 is formed as passageways through which the buffer solution 210 containing the sample is introduced or discharged. That is, as described above, the plurality of microchannels 150 is formed in the microchannel structure 100 as respective spaces between the cover part 140 and the partition wall 146 communicate with the inflow paths 152 and the discharge paths 154 formed in the support 110. In this case, a width of the microchannel 150 has a micro scale of about several millimeters or 1 mm or smaller.

Figure 7:
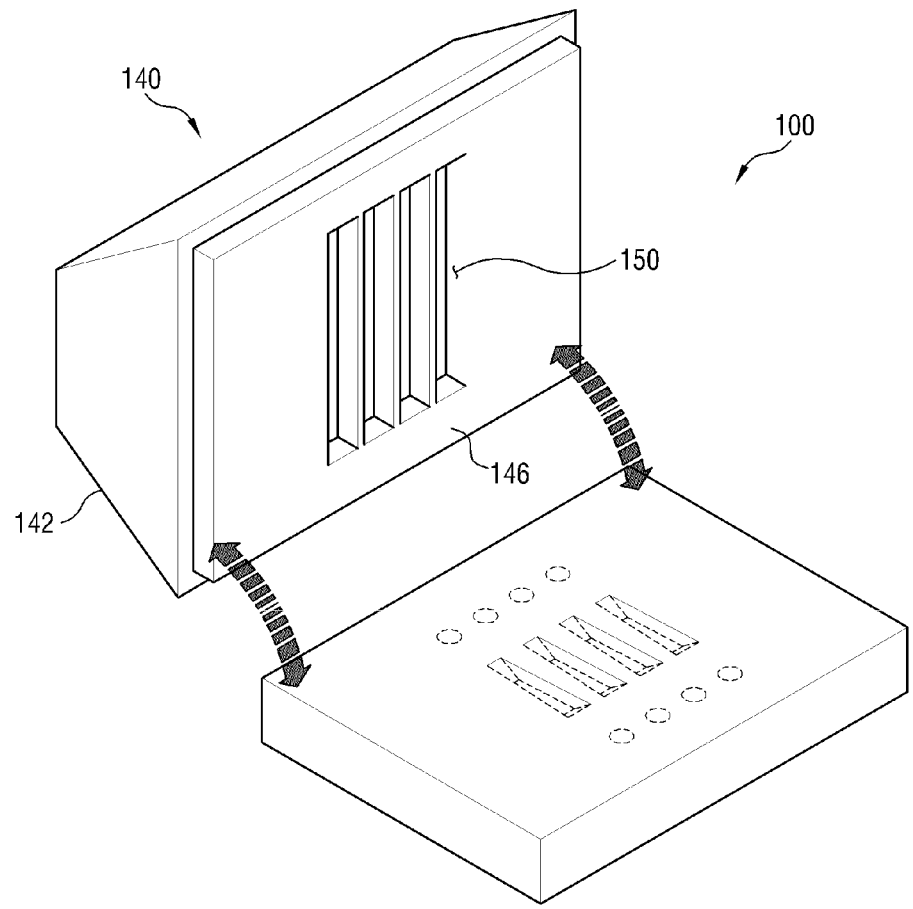
FIG. 7 is a perspective view of a multi-channel microchannel structure according to another exemplary embodiment of the present disclosure.

FIG. 7 is a perspective view illustrating another example of the multi-channel microchannel structure according to the present disclosure. As illustrated in FIG. 7, a cross section of the prism 142 of the multi-channel microchannel structure 100 may be formed in a trapezoidal shape. In this case, the polarized light generation part 300 and the polarized light detection part 400, which are illustrated in FIG. 5, are fixed at positions where the incident light and the reflective light enter the incident surface 143 and a reflective surface 144 of the prism 142 at a vertical angle or an angle, close to the vertical angle, which does not severely change a polarization state, or the incident light and the reflective light vertically enter the incident surface 143 and the reflective surface 144. A loss of incident light occurs in a case in which a flat plate is used instead of the prism structure, but the flat plate structure may be used in order to manufacture a simple structure.

Figure 8A:
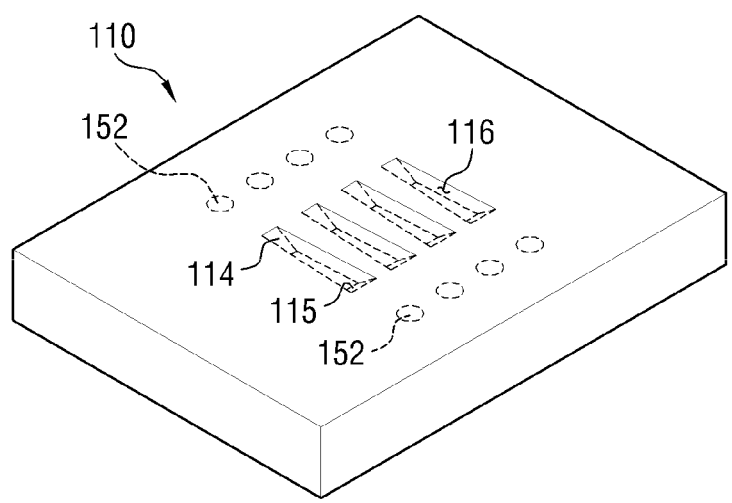
FIG. 8A is a perspective view of a support according to the exemplary embodiment of the present disclosure.
Figure 8B:
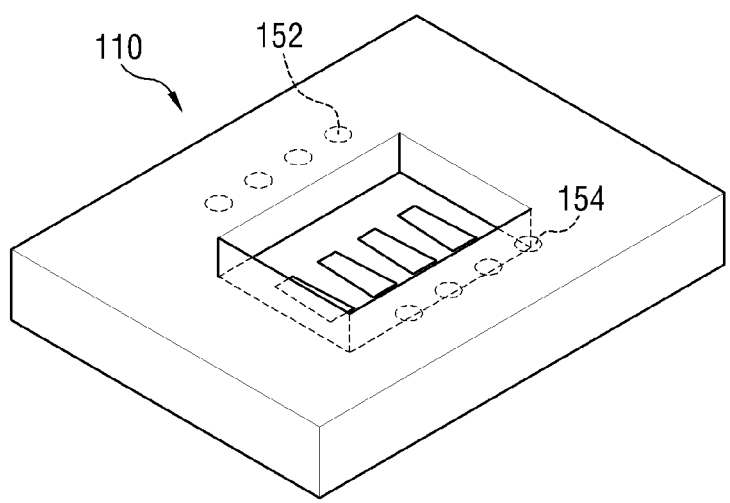
FIG. 8B is a bottom perspective view of the support according to the exemplary embodiment of the present disclosure.

A structure of the support 110 applied to the present disclosure will be described. FIG. 8A is a perspective view of the support according to the exemplary embodiment of the present disclosure, FIG. 8B is a bottom perspective view of the support according to the exemplary embodiment of the present disclosure, and FIG. 9 is a cross-sectional view of the support according to the exemplary embodiment of the present disclosure.

Opened through portions 116 are formed in an upper surface of the support 110, and the through portion 116 is opened in a trapezoidal shape. The trapezoidal shape of the through portion 116 is formed such that an upper side positioned in a direction toward the incident surface has a smaller length than a lower side positioned in a direction toward the reflective surface. Therefore, the through portion 116 serves as an aperture, thereby preventing scattering caused by the microchannel structure.

Figure 9:
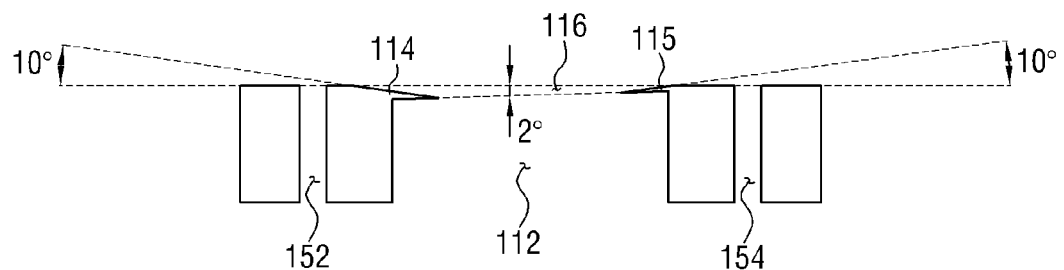
FIG. 9 is a cross-sectional view of the support according to the exemplary embodiment of the present disclosure.

As illustrated in FIG. 9, the upper side of the trapezoidal shape of the through portion 116 defines a first inclined portion 114 of which the upper side is inclined, and the lower side of the trapezoidal shape of the through portion 116 defines a second inclined portion 115 of which the upper side is inclined. The second inclined portion 115 is inclined in a direction opposite to a direction of the first inclined portion 114.

FIG. 9 illustrates that an angle formed between the first inclined portion 114 and the second inclined portion 115 is 10°, but the present disclosure is not limited thereto, the angle may be designed to an angle in a range from about 10° to about 80°. The inclination of the first inclined portion 114 and the inclination of the second inclined portion 115 induce a smooth flow in the microchannel 150. The buffer solution 210, which is introduced into the microchannel 150 through the inflow path 152, may smoothly flow along the inclination of the first inclined portion 114, and may smoothly flow toward the discharge path 154 along the inclination of the second inclined portion 115.

A width of a cross section of each of the first inclined portion 114 and the second inclined portion 115 is decreased toward a pointed end thereof, and the pointed end of the first inclined portion 114 is positioned lower than the pointed end of the second inclined portion 115. An angle formed between a line segment defined by the upper surface of the support 110 and a line segment connecting the pointed end of the first inclined portion 114 and the pointed end of the second inclined portion 115 may be set to about 2°.

The present disclosure may be implemented by a single-channel microchannel structure. The single-channel microchannel structure 100 has the single microchannel 150. That is, the cover part 140 has the prism 142, and a pair of partition walls 146 formed at both ends of a lower surface of the prism, and the single inflow path 152 and the single discharge path 154 are formed in the support 110, such that the single-channel microchannel 150 is formed.

Further, a plurality of different self-assembled monolayers (SAM) 132 is formed on the substrate or another adsorption layer is formed on the same self-assembled monolayers. The self-assembled monolayer 132 is formed as monomers formed in a head group and a tail group is voluntarily arranged by a method of chemical adsorption of molecules. In this case, a functional group of a tail group of each of the self-assembled monolayers 132 is chemically converted, such that interface properties of the respective self-assembled monolayers 132 may vary. That is, the respective self-assembled monolayers 132 have sensor structures having different adsorption and dissociation degrees with respect to the sample, and may simultaneously measure various adsorption and dissociation dynamic characteristics of the biomaterial.

As illustrated in FIG. 5, the sample injection part 200 injects the buffer solution 210 containing the sample (not illustrated) made of a low molecular biomaterial into the inflow path 152 of the microchannel 150. The sample injection part 200 has a structure for dissolving the sample in the buffer solution 210 with constant concentration, and has valve device (not illustrated) capable of injecting the buffer solution 210 into the microchannel 150 and blocking the injection of the buffer solution 210.

In this case, the sample injection part 200 may inject the buffer solution 210 into the microchannels 150 of the respective channels while changing concentration of the sample or at a time interval. Meanwhile, when the buffer solution 210 is injected into the microchannel 150, a part of the sample (not illustrated) is adsorbed onto the dielectric thin film 130, such that the adsorption layer 160 having a predetermined thickness is formed. In this case, the adsorption layer 160 may be the self-assembled monolayer 132 suitable for binding properties of various biomaterials, or a multilayer film made of various types of biomaterials including a fixing material and a low molecular material bound to the fixing material.

As illustrated in FIG. 5, the polarized light generation part 300 serves to emit the polarized incident light to the adsorption layer 160 through the incident surface 143 of the prism 142 of the microchannel structure 100. The polarized light generation part 300 has a light source 310 and a polarizer 320 as essential constituent elements, and may have a collimating lens 330, a focusing lens 340, or a first compensator 350.

In this case, the polarizer 320 and the first compensator 350 may be configured to be rotatable or another polarization modulating means may be further provided. Meanwhile, the polarized incident light has p-wave and s-wave polarized light components, and light, which is almost close to the P wave, may enter in order to increase a signal-to-noise ratio. In this case, in the present disclosure, the incident light needs to be emitted at an incident angle θ that satisfies the p-wave antireflection condition. In an ellipsometric equation, a complex reflection coefficient ratio ρ may be represented by a ratio of a reflection coefficient ratio Rp of the P wave to a reflection coefficient ratio Rs of the S wave, that is, ρ=Rp/Rs, and the p-wave antireflection condition refers to a condition in which the reflection coefficient ratio Rp of the P wave has a value close to zero. The p-wave antireflection condition is similar to the surface plasmon resonance condition of the SPR sensor in the related art, and refers to a condition in which measurement sensitivity of the present disclosure is highest.

The light source 310 emits monochromatic light in a wavelength range of an infrared ray, visible light, or an ultraviolet ray, or emits white light. Various types of lamps, light emitting diodes (LEDs), lasers, laser diodes (LDs), and the like may be used as a light source 310. In this case, the light source 310 may have a structure that may change a wavelength in accordance with a structure of an optical system. Meanwhile, in the vicinity of the p-wave antireflection condition, a magnitude of an optical signal of the reflective light may be relatively small, and in this case, a signal-to-noise ratio is increased by emitting a large amount of light by using the laser or the laser diode LD, and as a result, it is possible to perform the measurement with high sensitivity.

The polarizer 320 has a polarizing plate, and polarizes the light emitted from the light source 310. In this case, the polarized light components include the P wave in a direction parallel to the incident surface, and the S wave in a direction perpendicular to the incident surface.

The collimating lens 330 receives light from the light source 310, and provides parallel light to the polarizer 320. Further, the focusing lens 340 converges the parallel light passing through the polarizer 320, thereby increasing the amount of incident light. In addition, the first compensator 350 serves to retard a phase of the polarized light component of the incident light.

As illustrated in FIG. 5, the reflective light, which is reflected by the adsorption layer 160 through the reflective surface 144 of the prism 142, enters the polarized light detection part 400, and the polarized light detection part 400 serves to detect a change in polarization state. The polarized light detection part 400 has an analyzer 410, a photodetector detector 420, and an arithmetic processor 430 as essential constituent elements, and may have a second compensator 440 and a spectrometer 450. In this case, the analyzer 410 has a polarizing plate corresponding to the polarizer 320 and polarizes the reflective light again, thereby controlling a polarization degree of the reflective light or a direction of a polarization plane. In addition, the analyzer 410 may be configured to be rotatable in accordance with the structure of the optical system, or may further include a polarized light modulating means that may perform a function of changing a phase of the polarized light component or eliminating the polarized light component.

The photodetector 420 serves to obtain optical data by detecting the polarized reflective light, and convert the optical data into electrical signals. In this case, the optical data include information about the polarization state of the reflective light. A CCD-type solid state pickup device, a photomultiplier tube (PMT), or a silicon photodiode may be used as the photodetector 420.

The arithmetic processor 430 serves to obtain the electrical signal from the photodetector 420 and derive a measured value. A predetermined analysis program using reflectometry and ellipsometry is embedded in the arithmetic processor 430, and the arithmetic processor 430 extracts and analyzes the optical data converted into the electrical signal, thereby deriving measured values such as adsorption concentration of the sample, a thickness of the adsorption layer 160, an adsorption constant, a dissociation constant, and a refractive index. In this case, the arithmetic processor 430 may derive the measured value by obtaining the ellipsometric constants $\psi$ and $\Delta$ related to a phase difference of the ellipsometry in order to improve measurement sensitivity.

The second compensator 440 serves to adjust a polarized light component of the reflective light by retarding a phase of the polarized light component of the reflective light. The second compensator 440 may be configured to be rotatable, or another polarized light modulating means may be further provided.

The spectrometer 450 is used in a case in which the light source 310 emits white light. The spectrometer 450 serves to split the reflective light, separate the reflective light having a wavelength in a narrow region, and send the reflective light to the photodetector 420. In this case, the photodetector 420 may obtain the optical data regarding distribution of the reflective light by using a two-dimensional image sensor such as the CCD-type solid state pickup device.

Oblique Incidence, Prism-Incident, Silicon-Based, Immersion Microchannel-Based Measurement Method Hereinafter, a method and a principle of simultaneously measuring molecular binding properties and a refractive index of the buffer solution will be described with reference to the accompanying drawings.

Figure 10:
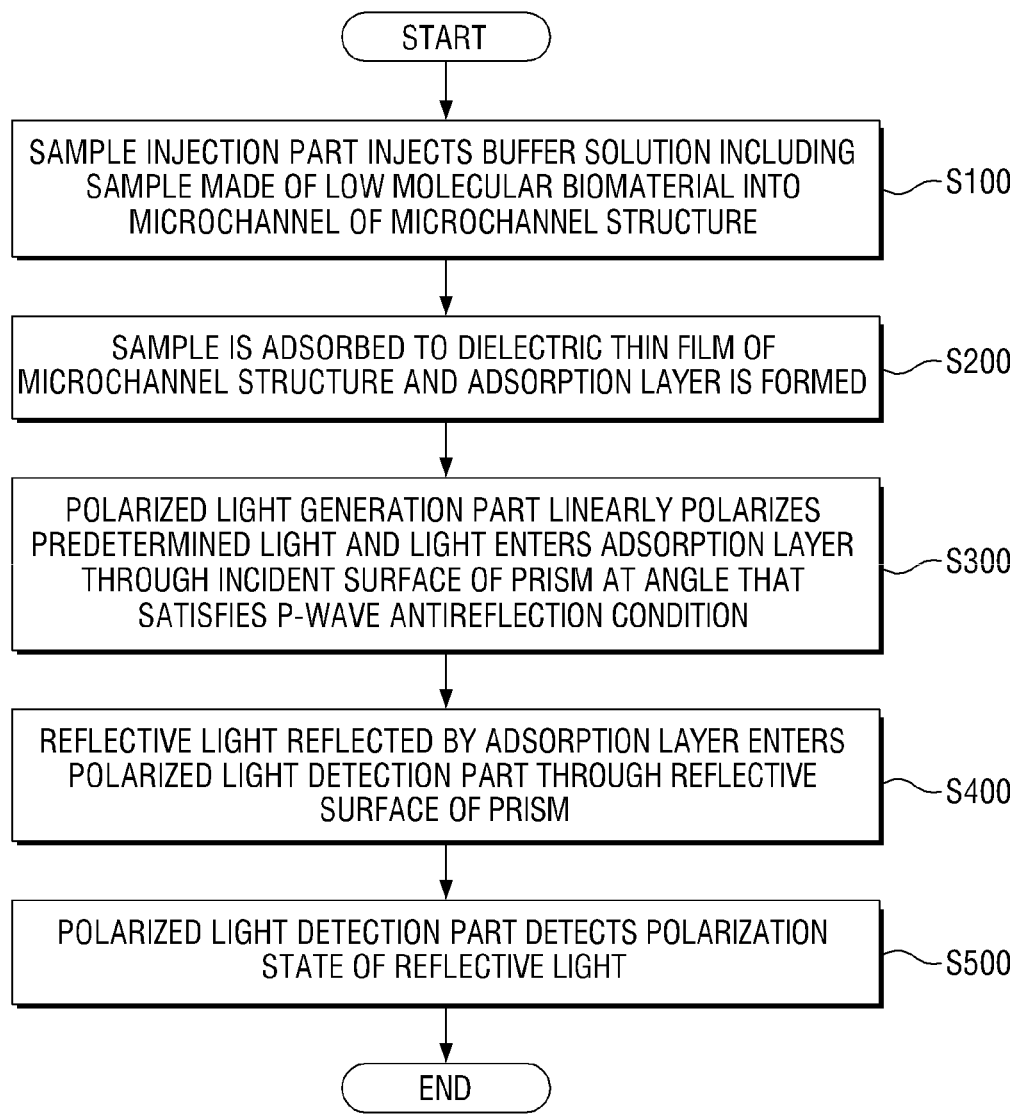
FIG. 10 is a flowchart of an immersion microchannel measurement method according to the exemplary embodiment of the present disclosure.

FIG. 10 is a flowchart illustrating a method of simultaneously measuring molecular binding properties and a refractive index of the buffer solution according to the present disclosure. As illustrated in FIG. 10, the measurement method of the present disclosure performed through first to fifth steps S100 to S500.

As illustrated in FIG. 5, in the first step S100, the sample injection part 200 dissolves the sample (not illustrated) made of a biomaterial such as a low molecular material in the buffer solution 210, and injects the buffer solution 210 into the microchannel 150 of the microchannel structure 100. In this case, the sample injection part 100 may inject the buffer solutions 210 containing the sample with different concentration to the respective multi-channel microchannels 150.

In addition, the sample injection part 100 may inject the buffer solution 210 into the respective microchannels 150 at a time interval. In addition, the buffer solution 210 may be injected only into some of the microchannels 150, and the remaining microchannels 150 may not be used.

In the second step S200, the sample (not illustrated) made of the biomaterial is adsorbed to the substrate 120 or the dielectric thin film 130, such that the adsorption layer 160 is formed.

On the contrary, the sample is adsorbed to the plurality of different self-assembled monolayers 132 formed in the single-channel microchannel structure 100 illustrated in FIG. 8, or adsorbed to a plurality of adsorption layers on the same self-assembled monolayers, such that the adsorption layers having different binding properties may be formed.

In the third step S300, the polarizer 320 polarizes predetermined light emitted from the light source 310, and allows the light to enter the adsorption layer 160 through the prism 142 of the microchannel structure 100. In this case, the light passes through the incident surface of the prism 142, is refracted at a predetermined angle by a refractive index of the buffer solution 210 existing at a lower end of the prism 142, and then enters the adsorption layer 160. In this case, the polarized incident light has the p-wave and s-wave polarized light components. Meanwhile, the incident light needs to have the incident angle $\theta$ that satisfies the p-wave antireflection condition.

In the fourth step S400, the reflective light reflected by the adsorption layer 160 enters the polarized light detection part 400 through the prism 142 of the microchannel structure 100. In this case, the reflective light is in an elliptically polarized state.

In the fifth step S500, the polarized light detection part 400 detects a polarization state of the reflective light. Specifically, first, the analyzer 410 receives the reflective light elliptically polarized at the adsorption layer 160, and allows only the light according to polarization properties to pass therethrough.

Next, the photodetector 420 obtains predetermined optical data by detecting a change in polarized light component of the reflective light, converts the optical data into an electrical signal, and transmits the electrical signal to the arithmetic processor 430.

Next, the arithmetic processor 430 in which a program using the reflectometry or the ellipsometry is embedded extracts and analyzes the optical data converted into the electrical signal, and derives measured values such as adsorption concentration of the sample, adsorption and dissociation constants, a refractive index, and a refractive index of the buffer solution.

In this case, in the present disclosure, the arithmetic processor 430 measures the measured value of the refractive index of the buffer solution by obtaining the ellipsometric constant Δ related to a phase difference of the ellipsometry, and obtains binding dynamic characteristics by measuring the ellipsometric constant ψ related to an amplitude ratio. The reason is that only a change in refractive index of the buffer solution may be measured because the ellipsometric constant Δ related to a phase difference is changed sensitive only to a change in refractive index of the buffer solution and rarely affected by the binding properties under the p-wave antireflection condition, and the ellipsometric constant ψ related to the amplitude ratio is mainly changed with high sensitivity in accordance with binding properties of the material.

Therefore, only pure binding properties are obtained by simultaneously measuring, by means of ψ, binding properties of the sample, which is included in the buffer solution and introduced, and measuring, by means of Δ, a change in refractive index which is changed when the sample is dissolved in the buffer solution, or a change in refractive index of the buffer solution containing a solvent such as DMSO used to dissolve the sample.

Experimental Example

Figure 11:
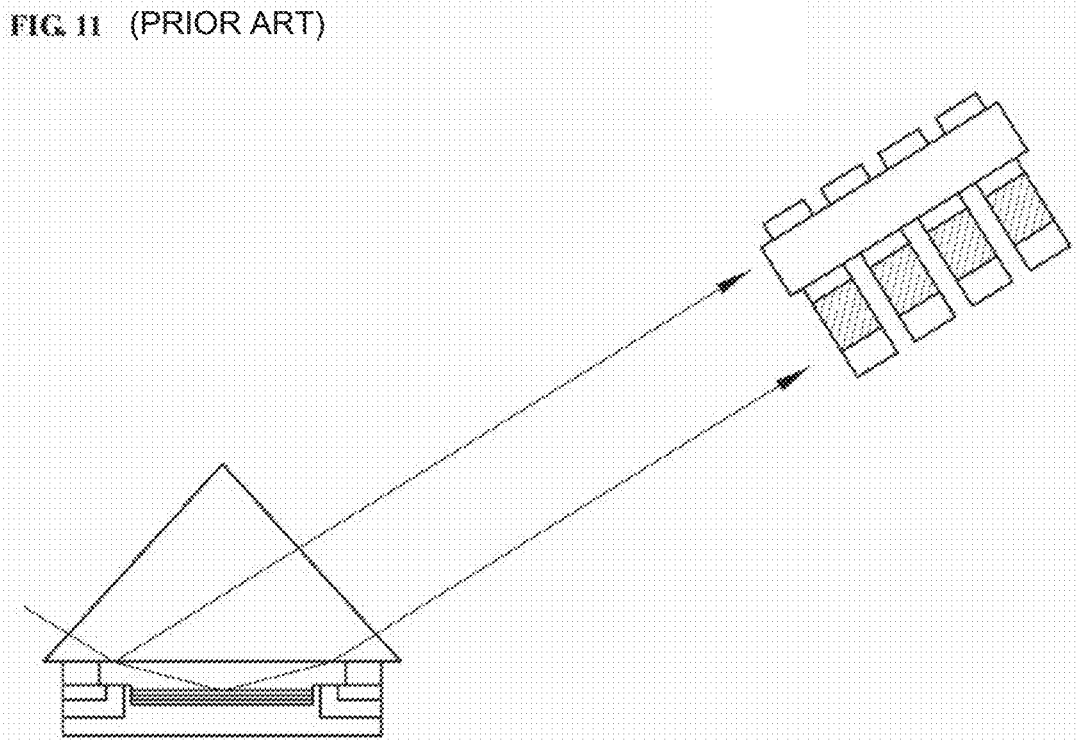
FIG. 11 is a schematic view illustrating a path of light reflected by a sample in a vertical incident structure of a prism of the prior patent.

FIG. 11 is a view illustrating a path of light after the light is reflected by the sample in the vertical incident structure of the prism of the prior patent.

In the present experiment, a wavelength of the light source 310 is 532 nm, a refractive index of the prism is n=1.5195 BK7, and light is refracted on the boundary surface between the prism and the buffer solution (n=1.333), such that the polarized light enters the sensor on the silicon substrate at an angle of 72.14° to 72.15° which corresponds to the p-wave antireflection condition.

In a case in which the bottom surface of the prism and the silicon substrate are parallel to each other as illustrated in FIG. 11, the light reflected by the boundary surface between the prism and the buffer solution and the light reflected by the silicon substrate travel in parallel. In a case in which an interval between the boundary surface of the prism and the silicon substrate is decreased to about 1 mm or smaller in order to minimize consumption of the sample, the two lights are diffused while traveling, and as a result, it is difficult to separate the light by means of the photodetector, which is a main cause of a measurement error.

Figure 12A:
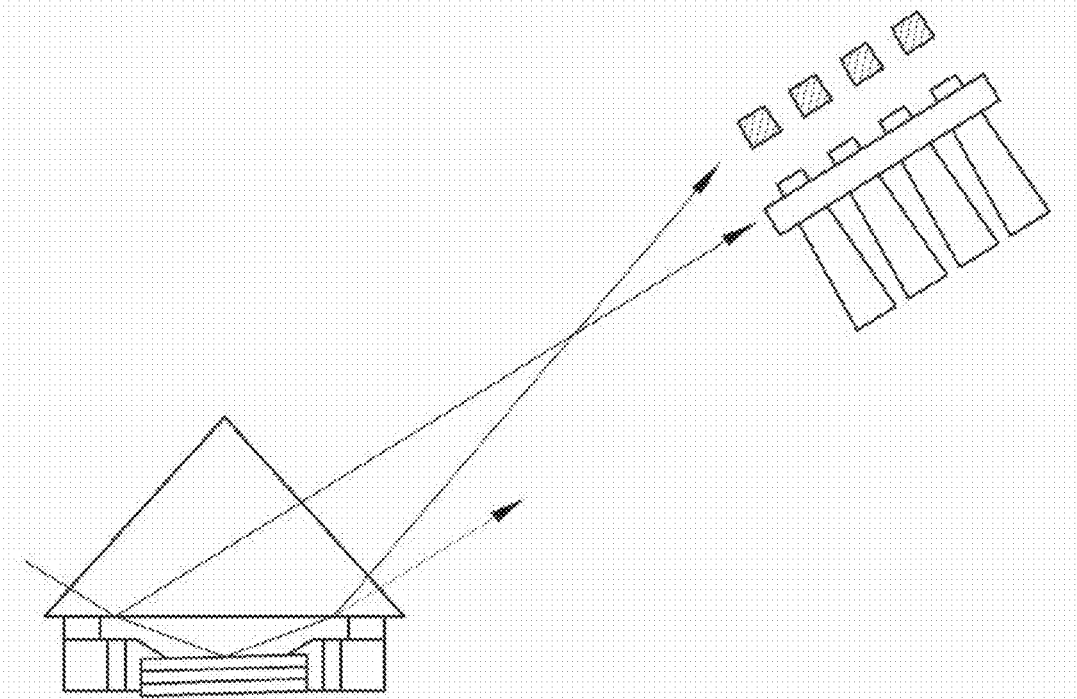
FIG. 12A is a schematic view illustrating a path of light reflected in the immersion microchannel measurement device according to the exemplary embodiment of the present disclosure.

However, in a case in which the oblique incidence, prism-incident, silicon-based, immersion microchannel-based measurement method is used by inclining the bottom surface of the prism and the silicon substrate at about 2° as illustrated in FIG. 12A, the light reflected by the boundary surface between the prism and the buffer solution and the light reflected by the silicon substrate may be completely separated while the light travels, thereby solving the problems of the prior patent.

In addition, the separated light travels in a direction different from that of the microchannel structure attached to the boundary surface of the prism, and as a result, it is possible to reduce noise caused by light scattering in the microchannel structure.

Figure 12B:
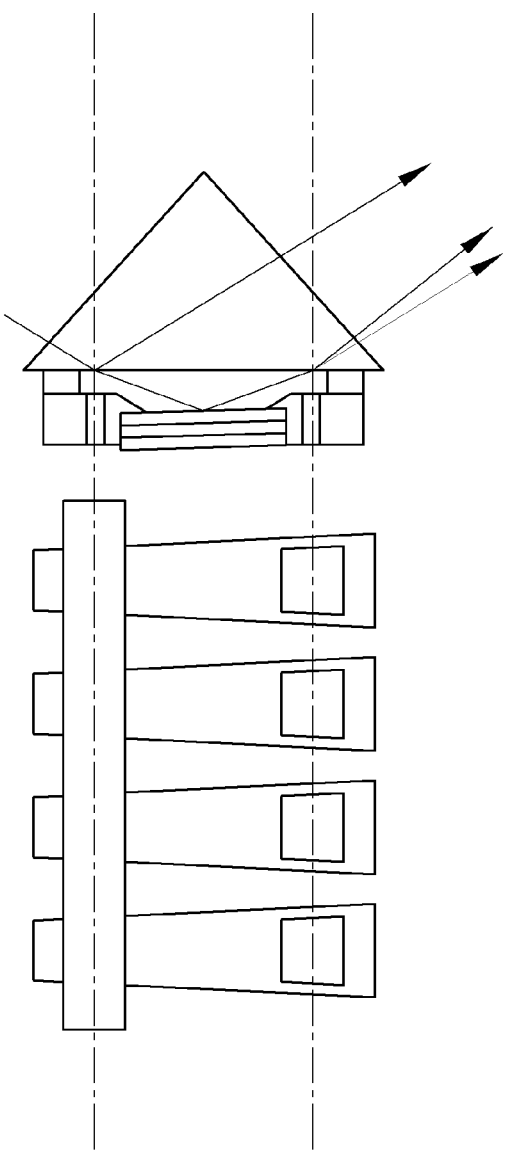
FIG. 12B illustrates a trapezoidal microchannel structure and an oblique incidence, prism-incident, silicon-based, immersion microchannel-based measurement method according to the exemplary embodiment of the present disclosure.

FIG. 12B illustrates a trapezoidal microchannel structure and the oblique incidence, prism-incident, silicon-based, immersion microchannel-based measurement method. When laser light enters a narrow microchannel of the trapezoidal microchannel, by means of a cylinder lens, the light is reflected by the silicon surface inclined at an angle of 2°, and then passes through a wide microchannel, and the microchannel through which the light passes first serves as an aperture, such that the light passes through the wide microchannel without being scattered at the boundary surface of the wide microchannel, and as a result, it is possible to minimize noise caused by irregularly scattered light on the microchannel boundary surface.

Figure 13A:
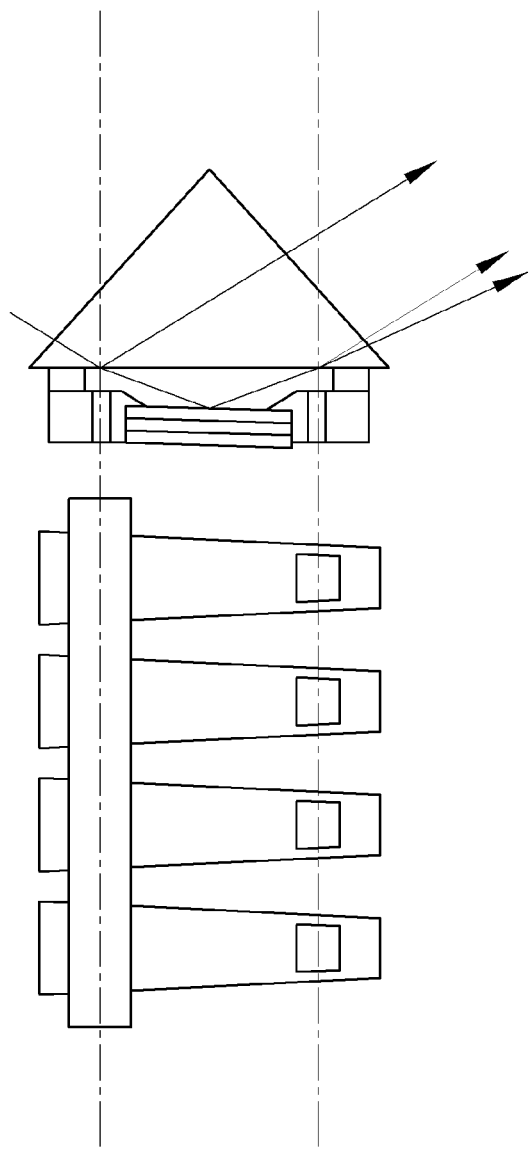
FIG. 13A is a schematic view illustrating a path of light reflected in an immersion microchannel measurement device according to another exemplary embodiment of the present disclosure.
Figure 13B:
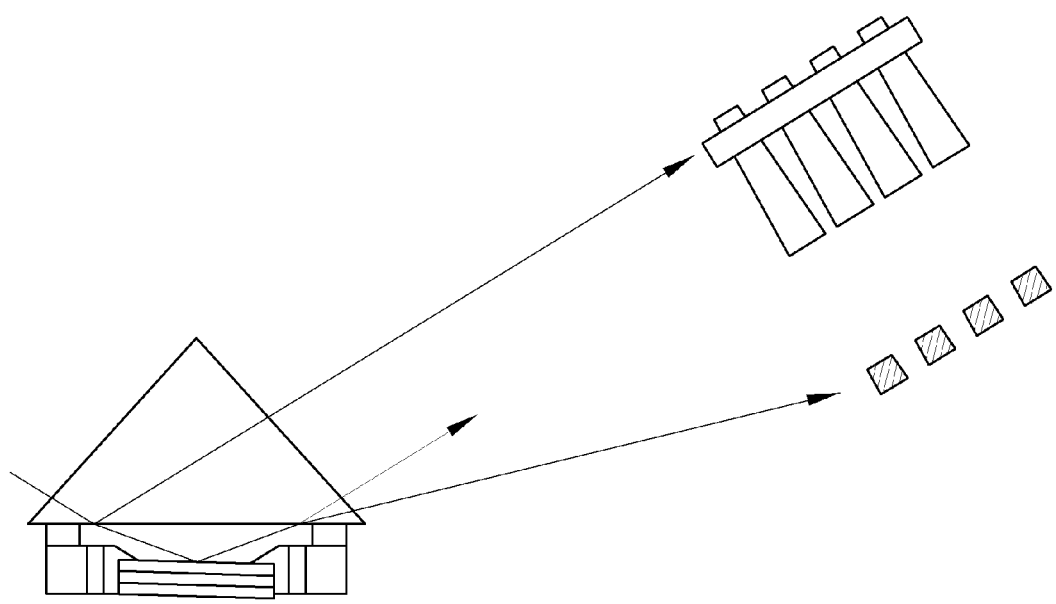
FIG. 13B illustrates a trapezoidal microchannel structure and an oblique incidence, prism-incident, silicon-based, immersion microchannel-based measurement method according to another exemplary embodiment of the present disclosure.

FIGS. 13A and 13B illustrate an immersion microchannel measurement device according to another exemplary embodiment of the present disclosure. Unlike FIGS. 12A and 12B, a structure of the support 110 is used in the opposite direction in FIGS. 13A and 13B. That is, the exemplary embodiment illustrated in FIGS. 13A and 13B is configured such that light enters the wide microchannel of the trapezoidal microchannel, and passes through the narrow microchannel.

In the case of the exemplary embodiment illustrated in FIGS. 13A and 13B, there is a problem in that a larger amount of light is scattered in comparison with the structure illustrated in FIG. 12A and FIG. 12B, and an error may occur. However, the exemplary embodiment illustrated in FIGS. 13A and 13B has an advantage in that the light reflected by the bottom surface of the prism enters at an angle smaller by 2° than an angle corresponding to the p-wave antireflection condition, and as a result, it is possible to greatly reduce intensity of the reflective light.

The invention claimed is:

1. An oblique incidence, prism-incident, silicon-based, immersion microchannel-based measurement device comprising:
    a microchannel structure which has a support, a substrate which is formed on the support and made of a semiconductor or dielectric material, a cover part which has a prism structure and is installed on the support, and a microchannel which is formed in any one of an upper portion of the support and a lower end of the cover part;
    a sample injection part which forms an adsorption layer for a sample on a substrate by injecting a buffer solution containing the sample made of a biomaterial into the microchannel;
    a polarized light generation part which emits polarized incident light through an incident surface of the prism structure to the adsorption layer at an incident angle that satisfies a p-wave antireflection condition; and
    a polarized light detection part which first reflective light reflected by at least one of the adsorption layer and the substrate enters through a reflective surface of the prism structure and which detects a change in polarization of the first reflective light;
    wherein the support has an upper surface with an opened through portion in the upper surface, the opened through portion is opened in a trapezoidal shape defining an aperture with an upper side of the opened through portion inclined upwards in a direction toward the incident surface and a smaller length than a lower side inclined upwards in a direction toward the reflective surface; and
    wherein a surface of the substrate is formed so as to form a predetermined inclination angle with a bottom surface of the prism structure.

2. The oblique incidence, prism-incident, silicon-based, immersion microchannel-based measurement device of claim 1, wherein the first reflective light travels in a direction different from that of light reflected by the bottom surface of the prism.

3. The oblique incidence, prism-incident, silicon-based, immersion microchannel-based measurement device of claim 2, wherein the polarized light detection part separates and detects the first reflective light and the light reflected by the bottom surface of the prism.

4. The oblique incidence, prism-incident, silicon-based, immersion microchannel-based measurement device of claim 1 wherein the incident light is emitted to the adsorption layer through the opened through portion, and the trapezoidal shape blocks a reflection of a part of the incident light.

5. The oblique incidence, prism-incident, silicon-based, immersion microchannel-based measurement device of claim 1 wherein the upper side of the trapezoidal shape defines a first inclined portion of which the upper side is inclined, and the lower side of the trapezoidal shape defines a second inclined portion of which the lower side is inclined.

6. The oblique incidence, prism-incident, silicon-based, immersion microchannel-based measurement device of claim 5, wherein a width of a cross section of each of the first inclined portion and the second inclined portion is decreased toward a pointed end thereof, and the pointed end of the first inclined portion is positioned lower than the pointed end of the second inclined portion.

7. The oblique incidence, prism-incident, silicon-based, immersion microchannel-based measurement device of claim 1 wherein an inflow path through which the buffer solution flows into the microchannel is formed at an upper side of the upper side of the trapezoidal shape of the through portion, and a discharge path through which the buffer solution flowing into the microchannel is discharged is formed at a lower side of the lower side of the trapezoidal shape of the through portion.

8. The oblique incidence, prism-incident, silicon-based, immersion microchannel-based measurement device of claim 1, wherein the inclination angle is in a range from 0° to 10°.

9. The oblique incidence, prism-incident, silicon-based, immersion microchannel-based measurement device of claim 1, wherein the microchannel structure further includes a dielectric thin film provided between the substrate and the adsorption layer, and the first reflective light further includes light reflected by the dielectric thin film.

10. An immersion microchannel measurement method comprising:

a first step of injecting, by a sample injection part, a buffer solution containing a sample made of a biomaterial into a microchannel of a microchannel structure;

a second step of forming an adsorption layer by adsorbing the sample to a substrate of the microchannel structure;

a third step of polarizing, by a polarized light generation part, light and allowing the light to enter the adsorption layer through an incident surface of a prism of the microchannel structure at an incident angle that satisfies a p-wave antireflection condition;

a fourth step of allowing first reflective light, which is reflected from at least one of the adsorption layer and the substrate, to enter through a reflective surface of the prism; and a fifth step of detecting, by a polarized light detection part, a change in polarization of the first reflective light;

wherein the microchannel structure has a support for the substrate, the support having an upper surface with an opened through portion in the upper surface, the opened through portion is opened in a trapezoidal shape defining an aperture with an upper side of the opened portion inclined upwards in a direction toward the incident surface and a smaller length than a lower side inclined upwards in a direction toward the reflective surface; and wherein a surface of the substrate is formed so as to form a predetermined inclination angle with a bottom surface of the prism.

11. The immersion microchannel measurement method of claim 10, wherein the first reflective light travels in a direction different from that of light reflected by the bottom surface of the prism, and in the fifth step, the polarized light detection part separates and detects the first reflective light and the light reflected by the bottom surface of the prism.

12. The immersion microchannel measurement method of claim 10, wherein the fifth step further includes:

polarizing, by an analyzer, the first reflective light;

detecting, by a photodetector, the polarized first reflective light and obtaining predetermined optical data; and obtaining, by an analysis means, a refractive index of the buffer solution by obtaining an ellipsometric constant related to a phase difference of ellipsometry based on the optical data, and deriving measured values including adsorption concentration of the sample and adsorption and dissociation constants by obtaining an ellipsometric constant related to an amplitude ratio.

* * * * *